ID 1398 US006033099A

United States Patent [19]
Kulis

[11] Patent Number: 6,033,099
[45] Date of Patent: Mar. 7, 2000

[54] ADD-ON-FLIP-UP HEADLIGHT WINKING SYSTEM AND METHOD OF WINKING HEADLIGHTS

[76] Inventor: Philip Kulis, 825 Rock Springs Dr., #101, Las Vegas, Nev. 89120

[21] Appl. No.: 09/048,151

[22] Filed: Mar. 25, 1998

[51] Int. Cl.[7] .................................................. B60Q 1/076
[52] U.S. Cl. ......................... 362/527; 362/233; 362/286; 362/428
[58] Field of Search ..................... 362/523, 526, 362/527, 525, 227, 233, 269, 285, 286, 271, 272, 428; 340/425.5, 468, 471

[56] References Cited

U.S. PATENT DOCUMENTS

| | | | |
|---|---|---|---|
| 4,709,306 | 11/1987 | Harris et al. | 362/68 |
| 4,768,134 | 8/1988 | Haydu et al. | 362/65 |
| 4,769,746 | 9/1988 | Sumlin | 362/66 |
| 4,943,895 | 7/1990 | Brandenburg | 362/66 |
| 5,027,301 | 6/1991 | Inoue et al. | 362/66 |
| 5,264,826 | 11/1993 | Henderson | 340/471 |
| 5,270,906 | 12/1993 | Kircher | 362/66 |

FOREIGN PATENT DOCUMENTS 1564504  4/1980  United Kingdom .................. 362/527

*Primary Examiner*—Sandra O'Shea
*Assistant Examiner*—Marshall Honeyman
*Attorney, Agent, or Firm*—Joseph N. Breaux

[57] ABSTRACT

An add-on flip-up headlight winking system which controls the flip-up headlights of the vehicle to give the appearance that a headlight has winked. Moreover, the add-on flip-up headlight winking system may be provided with a optional headlight flasher module which causes the headlights to flash during the winking mode of operation.

13 Claims, 3 Drawing Sheets

ADD-ON-FLIP-UP HEADLIGHT WINKING SYSTEM AND METHOD OF WINKING HEADLIGHTS

TECHNICAL FIELD

The present invention relates to flip-up headlights and, more particularly, to an add-on flip-up headlight winking system which controls the retractable headlights of the vehicle to give the appearance that a headlight has winked. Moreover, the add-on flip-up headlight winking system may be provided with a optional headlight flasher module which causes the headlights to flash during the winking mode of operation. Furthermore, a method of winking a headlight is provided.

BACKGROUND OF THE INVENTION

Typically, headlights are activated in dusk or night hours to illuminate the road directly ahead of the vehicle. However, while driving in daylight hours, headlights may be turned on momentarily (flashed) to attract the attention of a driver in another vehicle. However, the switching system of conventional headlight systems of manufactured vehicles, functions to turn on (illuminate) and flip-up both flip-up type headlights simultaneously. Henceforth, the conventional headlight systems do not allow the flip-up type headlights to be operated to give the appearance that a headlight has winked.

Several devices have been patented which are aimed at headlight assemblies which are rotated or pivoted.

U.S. Pat. No. 5,027,301, to Inoue et al., entitled "RETRACTABLE HEAD LAMP DEVICE AND A METHOD OF ASSEMBLING THE SAME" disclose a retractable head lamp device which is rotated to a retracted position or an operable position wherein when the head lamp device is in the operable position, the head lamp is projected above the outer surface of the hood of the vehicle.

U.S. Pat. No. 4,769,746, to Sumlin, entitled "PORTABLE FOG AND DRIVING LIGHT ASSEMBLY" discloses a rotatable fog light assembly which is in the form of an elongated shaft rotatable at opposite ends. In operation, the shaft is rotated from a first position generally vertically below the bumper of the vehicle and a second position generally behind and in the horizontal plane of the bumper.

U.S. Pat. No. 4,768,134, to Haydu et al., entitled "ACTUATOR MECHANISM FOR A CONCEALABLE HEADLAMP ASSEMBLY" discloses a headlamp assembly and a linkage of an actuator mechanism for rotating the headlamp assembly to a fully exposed position or a fully concealed position.

U.S. Pat. No. 4,709,306, to Harris et al., entitled "REMOTE ADJUSTING MEANS FOR A VEHICLE HEADLAMP" discloses a vehicle headlamp which can be adjusted for vertical and horizontal focusing.

Other patents in the headlamp art for vehicles are U.S. Pat. No. 5,270,906, to Kircher, entitled "SWIVELLABLE FASTENING SYSTEM FOR A HEADLIGHT UNIT" and U.S. Pat. No. 4,943,895, to Brandenburg, entitled "RETRACTABLE HEADLAMP ASSEMBLY".

While each of the above headlamp assemblies functions as desired, none of them provide a flip-up headlight winking system which controls the retractable headlights of the vehicle to give the appearance that a headlight has winked. Moreover, the above headlamp assemblies do not provide a flip-up headlight winking system which may be provided with a optional headlight flasher module to cause the headlights to flash during the winking mode of operation.

Furthermore, the above headlamp assemblies do not provide a method of winking a headlight.

As will be seen more fully below, the present invention is substantially different in structure, methodology and approach from that of the prior headlamp assemblies.

SUMMARY OF THE INVENTION

What is provided is a flip-up headlight winking system which controls the retractable headlights of the vehicle to give the appearance that a headlight has winked. Moreover, the flip-up headlight winking system may be provided with a optional headlight flasher module which causes the headlights to flash during the winking mode of operation. Furthermore, the present invention provides a method of winking a headlight.

The flip-up headlight winking system for winking a headlight comprises: a first flip-up headlight having a first headlight housing and a first headlight lamp; a first motor coupled to the first headlight housing for flipping up and down the first headlight housing; a second flip-up headlight having a second headlight housing and a second headlight lamp; a second motor coupled to said second headlight housing for flipping up and down said second headlight housing; and, a flip-up headlight winking control circuit for winking said first headlight and having a switch and a control logic circuit. When said switch is closed said control logic circuit activates said first headlight motor to flip up said first headlight housing and illuminates said first headlight lamp and, simultaneously, power flowing through said switch is delivered to said second headlight motor for flipping up said second headlight housing and to said second headlight lamp. After a first predetermined time interval from which said switch was closed, said control logic circuit turns off said first headlight motor to flip down said first headlight housing for a second short predetermined time interval. After said second short predetermined time interval, said control logic circuit activates said first headlight motor to flip-up said first headlight housing.

The method for winking a first flip-up headlight of the present invention comprises:

(a) closing a switch;

(b) activating first and second headlight motors to flip-up first and second headlight housings respectively;

(c) illuminating first and second headlight lamps;

(d) after a first predetermined time interval from which said switch was closed, turning off the first headlight motor to flip down the first headlight housing for a second short predetermined time interval;

(e) after the second short predetermined time interval, activating the first headlight motor to flip-up the first headlight housing.

Furthermore, the method of the present invention may repeat steps (d) and (e) until the switch is opened.

In view of the above, an object of the present invention is to provide a method which winks headlights via the following protocol:

|  | T0 | T1 | T2 | T3 | T4 |
|---|---|---|---|---|---|
| Switch SW1 | open | closed | closed | closed | open |
| Left Headlight Motor | off | on | on | on | off |

-continued

|  | T0 | T1 | T2 | T3 | T4 |
|---|---|---|---|---|---|
| Left Headlight Lamp | off | on | on | on | off |
| Right Headlight Motor | off | on | off | on | off |
| Right Headlight Lamp | off | on | on or off | on | off |

When switch SW1 is closed, the right and left headlight motors are activated (turned on) to flip-up the right and left headlights housings and illuminate (turn on) the right and left headlight lamps. Thereby, the vehicle has the appearance of two open eyes. After a first predetermined time interval in which switch SW1 was closed, right headlight motor is turned off so that right headlight motor flips down the right headlight housing for a second short predetermined time interval. During this short time interval right headlight lamp may be left on but preferably is turned off. The vehicle now has one headlight housing flipped up and illuminated and the other headlight housing flipped down. After the second short predetermined time interval, right headlight motor is activated to flip-up the right headlight housing. If the right headlight lamp was turned off during the short second predetermined time interval, right headlight lamp should be illuminated after the completion of the second short predetermined time interval. As a result, the vehicle has the appearance that the right headlight has winked. After the right headlight has winked, switch SW1 can be opened. Thereby turning off the right headlight motor, the right headlight lamp, the left headlight motor and the left headlight lamp. As right headlight motor and left headlight motor are turned off, the right and left headlight housings, respectively, are flipped down.

Alternately, after the right headlight has winked the right headlight may be controlled to wink again by turning off the right headlight motor to flip down the right headlight housing and turning off the right headlight lamp for a short predetermined time interval and then turning on the right headlight motor to flip up the right headlight housing and turning off the right headlight lamp. As can be appreciated, the right headlight has winked again. The right headlight may be winked until switch SW1 is turned off.

While the above method winks the right headlight, the method may alternately wink the left headlight in lieu of the right headlight.

Another object of the present invention is to provide a method of winking headlights wherein when the headlights are on, the headlight lamps may flash via a flasher module to accentuate the illumination of the headlight lamps as the winking operation is carried out.

A further object of the present invention is to provide such a flip-up headlight winking system which is an add-on accessory for use on existing vehicles or may be installed at the factory on new vehicles.

It is a still further object of the present invention to provide such a flip-up headlight winking system which functions to turn the headlights on and give the vehicle the appearance of winking when the vehicles standard headlight switch is in the off state.

It is a still further object of the present invention to provide a flip-up headlight winking system which comprises a control panel which is easily installed under the dash board to provide easy assess to such control panel while the driver is driving.

It is a still further object of the present invention to provide a flip-up headlight winking system having a blinking rate control means to control the duration of the second short predetermined time interval.

In view of the above objects, it is a feature of the present invention to provide a flip-up headlight winking system which is easy to install in a vehicle as an add-on accessory.

Another feature of the present invention to provide a flip-up headlight winking system which is simple to use while operating a vehicle.

A further feature of the present invention is to provide a flip-up headlight winking system which is relatively simple structurally therefore, the flip-up headlight winking system is simple and inexpensive to manufacture.

It is a still further feature of the present invention to provide a flip-up headlight winking system which can be installed on most manufactured vehicles having flip-up type headlights.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 3:
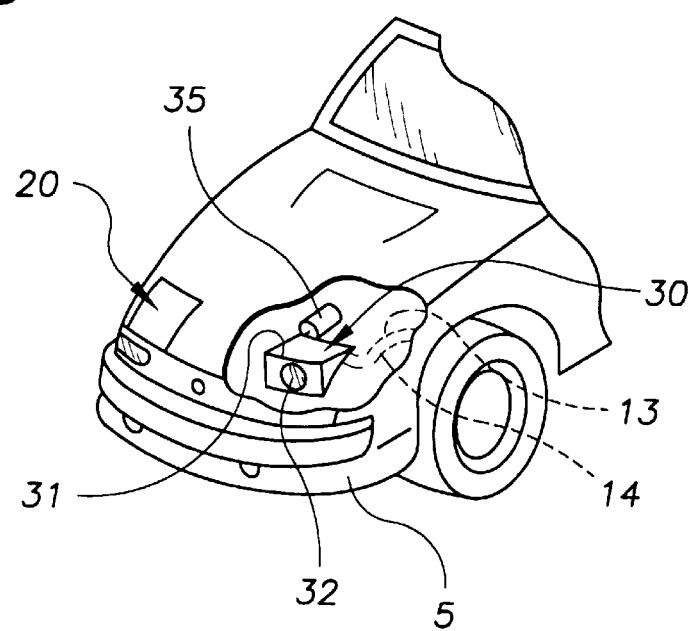
FIG. 3 illustrates a front view of a vehicle having a portion of the hood removed to show a flip-up headlight.
Figure 4:
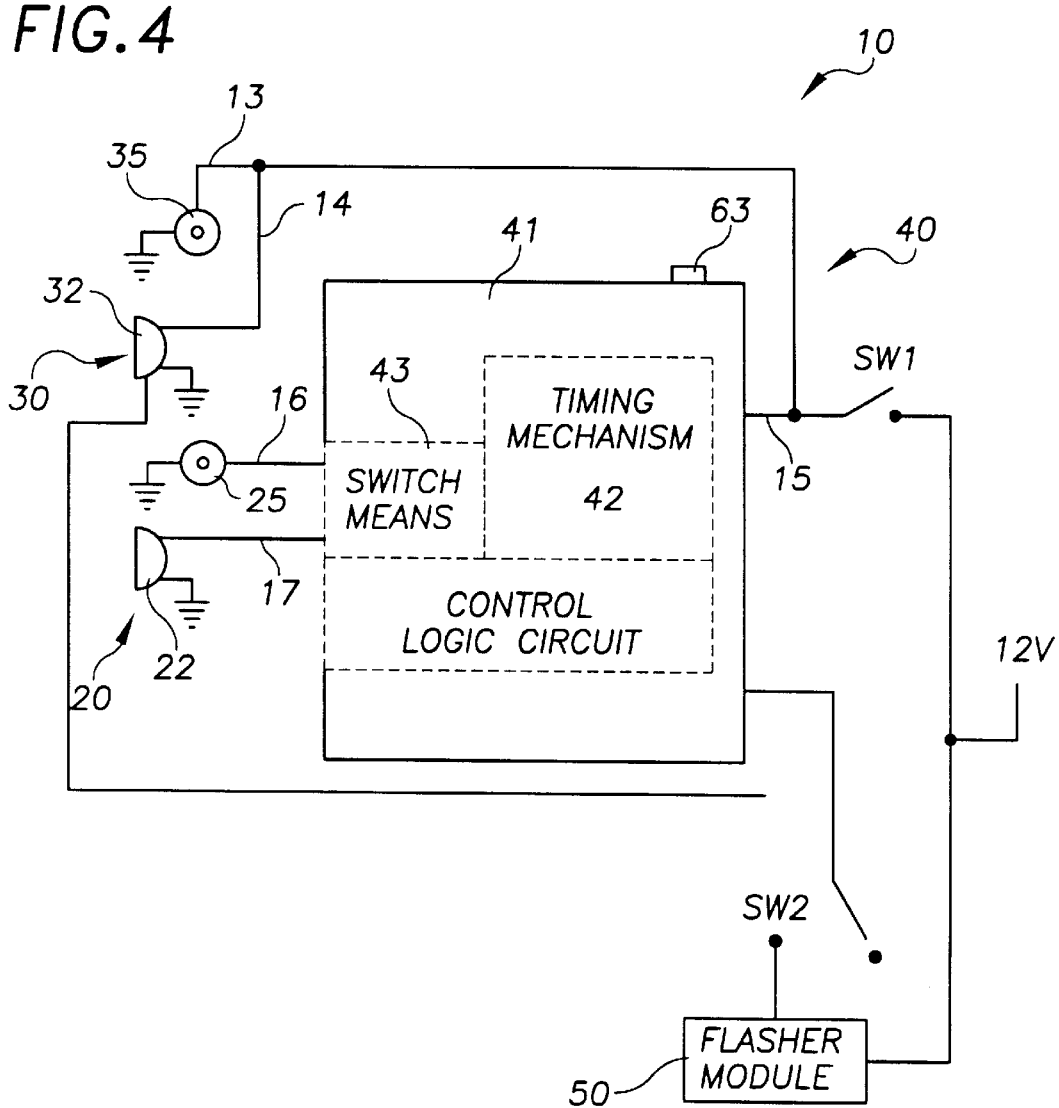
FIG. 4 illustrates the block diagram of the flip-up headlight winking system of the preferred embodiment of the present invention; and, FIG. 5 illustrates the control panel for controlling the operation of the flip-up headlight winking system of the present invention.

Referring now to the drawings, and in particular FIG. 4, the flip-up headlight winking system of the present invention is designated generally by the numeral 10. Referring also to FIG. 3, flip-up headlight winking system of the present invention is designed to be coupled to vehicle 5 having flip-up headlights. Flip-up headlight winking system 10 is comprised of conventional right flip-up headlight 20, right headlight motor 25, conventional left flip-up headlight 30, left headlight motor 35, flip-up headlight winking control circuit 40 and control panel 60 (FIG. 5).

Figure 5:
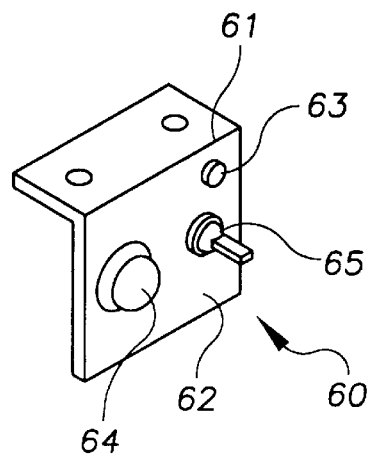

Referring also to FIG. 5, control panel 60 comprises a mounting bracket 61 attachable to the underside of the dashboard of vehicle 5 via a plurality of screws (not shown). Control panel 60 further comprises front panel member 62 having coupled thereto blink rate control knob 63, push button switch pad 64 for opening or closing switch SW1 and optional toggle switch knob 65 for switching switch SW2 for activating optional flasher module 50. Control panel 60 should be positioned to provide easy access by the driver to blink rate control knob 63, push button switch pad 64 and optional toggle switch knob 65.

Conventional right flip-up headlight 20 comprises right flip-up headlight housing 21 and right headlight lamp 22 housed in right flip-up headlight housing 21. Similarly, conventional left flip-up headlight 30 comprises left flip-up headlight housing 31 and left headlight lamp 32 housed in left flip-up headlight housing 31. Right and left flip-up headlight housings 21 and 31 are conventional flip-up headlight housings which are flipped up via the actuation of right and left headlight motors 25 and 35, respectively. Additionally, right and left flip-up headlight housings 21 and 31 are flipped down when right and left headlight motors 25 and 35 are turned off or inactivated.

Flip-up headlight winking control circuit 40 comprises switch SW1 coupled to a 12V power source such as provided by the vehicle's battery (not shown), control logic circuit 41 and optional flasher module 50 and flasher module on/off switch SW2.

When switch SW1 is closed, manually by the driver via push button switch pad 64, power from the 12V power source is delivered to left headlight motor 35 and left headlight lamp 32 via paths 13 and 14, respectively. The driver should maintain push button switch pad 64 depressed during the winking operation. When power is delivered to left headlight motor 35, left headlight housing 31 is flipped up. Simultaneously, power is delivered to control logic circuit 41 via path 15. Control logic circuit 41 functions to control right headlight motor 25 and right headlight lamp 22 via paths 16 and 17, respectively.

Control logic circuit 41 in general comprises timing mechanism 42 and switching means 43. In the preferred embodiment switching means 43 is a double pole double throw relay controlled by timing mechanism 42. Nevertheless, in lieu of a double pole double throw relay, two single pole relays may be substituted or other suitable switching mechanisms. Timing mechanism 42 transitions through the timing sequence set forth below in Table 1. Control logic circuit 41 varies the duration of the second short predetermined time interval via blinking rate control knob 63. In other words, blinking rate control knob 63 controls the rate of blinking right headlight 20 by increasing or decreasing the second short predetermined time interval.

Figure 1:
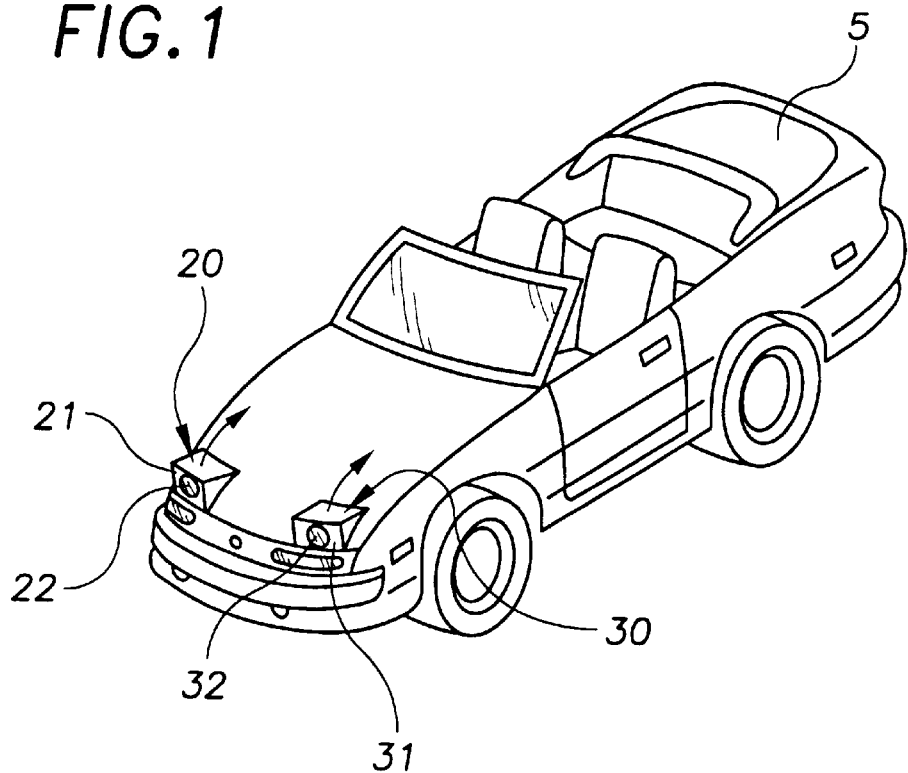
FIG. 1 illustrates a perspective view of a vehicle while the left and right headlight housings are both flipped-up and the left and right headlight lamps, respectively, illuminated.
Figure 2A:
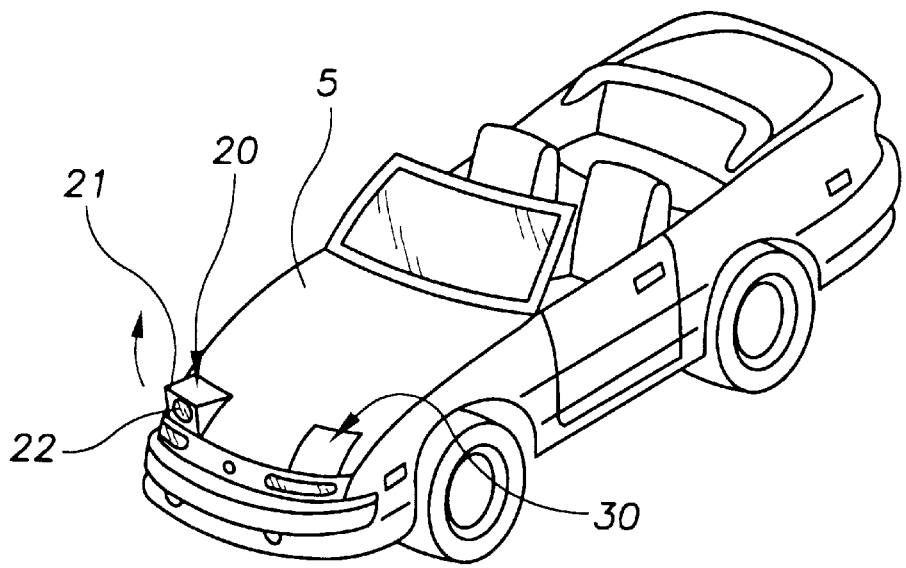
FIG. 2a illustrates a perspective view of a vehicle while the right headlight is in the winking mode of the flip-up headlight winking system of the present invention.

In operation, when switch SW1 is closed timing mechanism 42 of control logic circuit 41 initiates the timing sequence for performing the winking operation of right and left headlights 20 and 30. When switch SW1 is closed, control logic circuit 41 switches switching means 43 to deliver power to right headlight motor 25 and right headlight lamp 22 via paths 16 and 17, respectively, thereby turning on right headlight lamp 22 and flipping up right headlight housing 21 via right headlight motor 25. Simultaneously, when switch SW1 is closed, power is delivered to left headlight motor 35 and left headlight lamp 32 via paths 13 and 14, respectively, thereby turning on left headlight lamp 32 and flipping up left headlight housing 31 via left headlight motor 35, as best seen in FIG. 1. After a first predetermined time interval from which switch SW1 was closed, control logic circuit 41 turns off right headlight motor 25 so that right headlight motor 25 flips down right headlight housing 21 for a second short predetermined time interval. During this short time interval, right headlight lamp 22 preferably is turned off. Vehicle 5 now has left headlight housing 31 flipped up and left headlight lamp 32 illuminated and right headlight housing 21 flipped down, as best seen in FIG. 2a. After the second short predetermined time interval, control logic circuit 41 activates right headlight motor 25 to flip-up right headlight housing 21 via path 16. If right headlight lamp 22 was turned off during the short second predetermined time interval, right headlight lamp 22 should be illuminated after the completion of the second short predetermined time interval via path 17. As a result, vehicle 5 has given the appearance that right headlight 20 has winked. After a third predetermined time interval, switch SW1 is opened thereby removing power from paths 13 and 14 and 15 to turning off right headlight motor 25, right headlight lamp 22, left headlight motor 35 and left headlight lamp 32. As right headlight motor 25 and left headlight motor 35 are turned off, right and left headlight housings 21 and 31, respectively, are flipped down.

If the user desires to flash right and left headlight lamps 22 and 32, respectively, toggle switch knob 65 is switched on thereby switching switch SW2 to flasher module 50. Flasher module 50 delivers a signal to control left headlight lamp 32 to flash the entire duration of the winking operation or until toggle switch knob 65 is turned off. Flasher module 50 further delivers a signal to control logic circuit 41 wherein control logic circuit 41 controls right headlight lamp 22 to flash during the times right headlight lamp 22 is illuminated (turned on) during the winking operation or until toggle switch knob 65 is turned off.

From the forgoing, the method for winking headlights is carried out via the following protocol:

TABLE 1

|  | T0 | T1 | T2 | T3 | T4 |
| --- | --- | --- | --- | --- | --- |
| Switch SW1 | open | closed | closed | closed | open |
| Left Motor | off | on | on | on | off |
| Left Headlight Lamp | off | on | on | on | off |
| Right Motor | off | on | off | on | off |
| Right Headlight Lamp | off | on | on or off | on | off |

The winking operation begins by closing switch SW1. Thereby activating (turning on) right and left headlight motors 25 and 35 to flip-up right and left headlight housing 21 and 31, respectively and illuminating (turning on) right and left headlight lamps 22 and 32, respectively, as best seen in FIG. 1. Henceforth, vehicle 5 has the appearance of two open eyes. After a first predetermined time interval from which switch SW1 was closed, turning off right headlight motor 25 so that right headlight motor 25 flips down right headlight housing 21 for a second short predetermined time interval. During this short time interval, right headlight lamp 32 may be left on but preferably is turned off. Vehicle 5 now has right headlight housing 21 flipped up and right headlight lamp 22 illuminated and left headlight housing 31 flipped down, as best seen in FIG. 2a. After the second short predetermined time interval, activating right headlight motor 25 to flip-up right headlight housing 21. If right headlight lamp 22 was turned off during the short second predetermined time interval, right headlight lamp 22 should be illuminated after the completion of the second short predetermined time interval. As a result, vehicle 5 has the appearance that right headlight 20 has winked. After the right headlight 20 has winked, switch SW1 can be opened. Thereby turning off right headlight motor 25, right headlight lamp 22, left headlight motor 35 and left headlight lamp 32. As right headlight motor 25 and left headlight motor 35 are turned off, right and left headlight housings 21 and 31, respectively, are flipped down.

Alternately, after right headlight 20 has winked, timing mechanism 42 may control right headlight 20 to wink again by turning off right headlight motor 25 to flip down right headlight housing 21 and turning off right headlight lamp 22 for a short predetermined time interval and then turning on right headlight motor 25 to flip up right headlight housing 21 and turning off right headlight lamp 22. As can be appreciated, right headlight 20 has winked again. Right headlight 20 may be winked until switch SW1 is turned off.

Figure 2B:
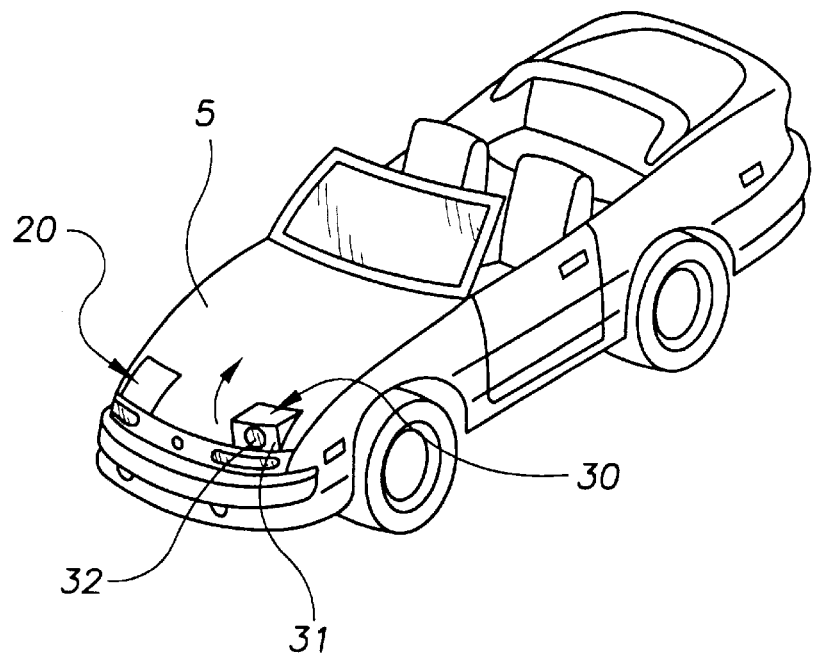
FIG. 2b illustrates an alternate perspective view of a vehicle while the left headlight is in the winking mode of the flip-up headlight winking system of the present invention.

While the above method winks right headlight 20, the method may alternately wink left headlight 30 in lieu of right headlight 20, as best seen in FIG. 2*b*. As can be appreciated, when winking left headlight 30 paths 13 and 14 should be coupled to right headlight motor 25 and right headlight lamp 22, respectively. Furthermore, paths 16 and 17 from control logic circuit 41 should be coupled to left headlight motor 35 and left headlight lamp 32, respectively.

When the user desires to accentuate the illumination of the illuminated right and left headlight lamps 22 and 32, the method also includes turning on switch SW2. Thereafter, delivering a signal to flash, via flasher module 50, right headlight lamp 22 and a signal to flash left headlight lamp 32, respectively, when right headlight lamp 22 and left headlight lamp 32 are illuminated. Preferably, switch SW2 is turned on before switch SW1 is closed. Nevertheless, switch SW2 can be turned on any time switch SW1 is closed.

The method for winking a headlight of the preferred embodiment of the present invention further comprises adjusting the duration of the short second predetermined time interval. Thereby the rate of blinking right headlight 20. In other words, increasing or decreasing the short second predetermined time interval increases or decreases the time interval in which right headlight housing 21 is flipped down.

It is noted that the embodiment of the a flip-up headlight winking system described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A flip-up headlight winking system for winking a first headlight comprising:

said first flip-up headlight having a first headlight housing and a first headlight lamp;

a first motor coupled to said first headlight housing for flipping up and down said first headlight housing;

a second flip-up headlight having a second headlight housing and a second headlight lamp;

a second motor coupled to said second headlight housing for flipping up and down said second headlight housing; and, a flip-up headlight winking control circuit for winking said first headlight and having a switch and a control logic circuit wherein when said switch is closed said control logic circuit activates said first headlight motor to flip up said first headlight housing and illuminates said first headlight lamp and, simultaneously, power flowing through said switch is delivered to said second headlight motor for flipping up said second headlight housing and to said second headlight lamp wherein after a first predetermined time interval from which said switch was closed, said control logic circuit turns off said first headlight motor to flip down said first headlight housing for a second short predetermined time interval wherein, after said second short predetermined time interval, said control logic circuit activates said first headlight motor to flip-up said first headlight housing.

2. The flip-up headlight winking system of claim 1, wherein during said second short predetermined time interval, said first headlight lamp is turned off and after the completion of said second short predetermined time interval said first headlight lamp is illuminated.

3. The flip-up headlight winking system of claim 1, further comprising:

a flasher on/off switch coupled to said control logic circuit and said second headlight lamp; and, a flasher module coupled to said flasher on/off switch for flashing said first headlight lamp when said first headlight lamp is illuminated and flasher on/off switch is on and for flashing said second headlight lamp when said second headlight lamp is illuminated and said flasher on/off switch is on.

4. The flip-up headlight winking system of claim 3, further comprising a control panel wherein said control panel comprises:

a mounting bracket attachable to an underside of a dashboard; and, a front panel member having coupled thereto blink rate control knob for controlling the duration of said second short predetermined time interval, push button switch pad for opening or closing said switch and a toggle switch knob for switching said flasher on/off switch for activating said flasher module.

5. The flip-up headlight winking system of claim 1, wherein said control logic circuit comprises:

a timing mechanism for carrying out the timing sequence for winking said first headlight; and, a switching means for switching said first headlight motor on and off and switching said first headlight lamp on and off.

6. The flip-up headlight winking system of claim 1, wherein said first headlight is a right flip-up headlight.

7. The flip-up headlight winking system of claim 1, wherein said first headlight is a left flip-up headlight.

8. A method for winking a headlight comprising the steps of:

(a) closing a switch;

(b) activating first and second headlight motors to flip-up first and second headlight housings respectively;

(c) illuminating first and second headlight lamps;

(d) after a first predetermined time interval from which said switch was closed, turning off the first headlight motor to flip down the first headlight housing for a second short predetermined time interval; and, (e) after the second short predetermined time interval, activating the first headlight motor to flip-up the first headlight housing.

9. The method of claim 8, further comprising after the step of (e) the steps of:

(f) opening said switch; and, (g) turning off the first headlight motor to flip down the first headlight housing, turning off the first headlight lamp, turning off the second headlight motor to flip down the second headlight housing, and turning off the second headlight lamp.

10. The method of claim 8, wherein the method step of (d) further comprises:

(d1) turning off the first headlight lamp during the short second predetermined time interval; and, wherein the method step of (e) further comprises:

(e1) turning on the first headlight lamp.

11. The method of claim 8, further comprising the steps of:

(f) turning on a second switch; and, (g) delivering a signal to flash the first headlight lamp and a signal to flash the second headlight lamp when the first and the second headlight lamps are illuminated.

12. The method of claim 8, further comprising the method steps of:

(g) adjusting a duration of the short second predetermined time.

13. The method of claim 8, further comprising after the step of (e) the method steps of:

(f) turning off the first headlight motor to flip down the first headlight housing for said second short predetermined time interval; and, (g) after the second short predetermined time interval, activating the first headlight motor to flip-up the first headlight housing.

* * * * *